(12) United States Patent
Nagasawa et al.

(10) Patent No.: US 8,596,676 B2
(45) Date of Patent: Dec. 3, 2013

(54) STEERING DEVICE (75) Inventors: Isamu Nagasawa, Tokyo (JP); Noriyoshi Baba, Tokyo (JP); Tetsuya Nakase, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/553,349

(22) Filed: Jul. 19, 2012

(65) Prior Publication Data
US 2013/0038044 A1    Feb. 14, 2013

(30) Foreign Application Priority Data

Aug. 9, 2011  (JP) .................................. 2011-174057

(51) Int. Cl.
*B60R 21/16* (2006.01)
(52) U.S. Cl.
USPC .......................................... 280/731; 280/734
(58) Field of Classification Search
USPC ..................... 280/731, 775, 777, 734; 74/493
See application file for complete search history.

(56) References Cited

U.S. PATENT DOCUMENTS

| 4,946,195 | A | * | 8/1990 | Ioka et al. ..................... 280/777 |
| 5,507,521 | A | * | 4/1996 | Steffens, Jr. .................. 280/775 |
| 2009/0039625 | A1 | * | 2/2009 | Breed ........................... 280/729 |

FOREIGN PATENT DOCUMENTS

JP         2006-69384         3/2006

* cited by examiner

*Primary Examiner* — Faye M. Fleming
(74) *Attorney, Agent, or Firm* — Smith, Gambrell & Russell, LLP (57) ABSTRACT

There is provided a steering device. The steering device has an airbag module that is disposed inside a steering wheel for steering a vehicle and that protects a vehicle occupant during a collision of the vehicle with another object by deploying an airbag body toward the vehicle occupant. The steering device includes a detecting unit that detects the collision of the vehicle with another object in advance; and an adjusting unit that positionally adjusts the steering wheel to a neutral position when the collision of the vehicle with another object is detected by the detecting unit, the neutral position of the steering wheel being a position of the steering wheel when the vehicle is traveling straight.

20 Claims, 6 Drawing Sheets

STEERING DEVICE

CROSS-REFERENCE TO RELATED APPLICATIONS

The present application claims priority from Japanese Patent Application No. 2011-174057 filed on Aug. 9, 2011, the entire contents of which are hereby incorporated by reference.

BACKGROUND OF THE INVENTION

1. Field of the Invention

The present invention relates to steering devices, and particularly, to a steering device in which an airbag body of an airbag module is accommodated in a center pad of a steering wheel.

2. Description of the Related Art

In the related art, there is known a steering device that accommodates a folded airbag body in a center pad of a steering wheel and protects a vehicle occupant from an impact generated due to a collision of the vehicle with another object by deploying the airbag body from the center pad toward the vehicle occupant in response to the impact.

The center pad of the steering wheel normally rotates together with the steering wheel in accordance with a driving operation of the vehicle occupant. Therefore, the airbag body accommodated in the center pad is formed into a circular shape so that the airbag body can be deployed in the same shape at any steering angle of the steering wheel. The circular airbag body mainly protects the vehicle occupant's head.

In recent years, there is an increasing demand for the airbag body accommodated in the center pad to sufficiently protect not only the vehicle occupant's head but also other body parts. In particular, because a seatbelt extends across the vehicle occupant's chest, there is a possibility that the vehicle occupant's chest may receive high pressure during a collision.

For example, Japanese Unexamined Patent Application Publication (JP-A) No. 2006-069384 discloses a vehicle airbag device that can sufficiently protect not only the vehicle occupant's head but also other body parts. In this device, an airbag body is installed in a non-rotating center pad, and the airbag body is formed with a shape having a head protection section, a chest protection section, and an abdomen protection section.

As mentioned above, in JP-A No. 2006-069384, since the airbag body is installed in the non-rotating center pad, the center pad is not rotated even when a rim of the steering wheel is rotated by the vehicle occupant driving the vehicle. In other words, in JP-A No. 2006-069384, only the rim of the steering wheel is rotated when the vehicle occupant is driving the vehicle.

In JP-A No. 2006-069384 in which only the rim of the steering wheel is rotated by the vehicle occupant driving the vehicle, it is difficult to ascertain whether or not the steering wheel is rotated. Thus, there is room for improvement since the feeling of security for the vehicle occupant is reduced.

Therefore, although the shape of the airbag body that can protect not only the vehicle occupant's head but also the vehicle occupant's chest and lumbar area can be set in advance in JP-A No. 2006-069384, the feeling of security for the vehicle occupant is reduced, which is a technical problem in terms of reduced level of safety when the vehicle occupant is driving.

SUMMARY OF THE INVENTION

In view of the circumstances in the related art described above, an object of the present invention is to provide a steering device that sufficiently protects not only the vehicle occupant's head but other body parts without reducing the feeling of security for the vehicle occupant, thereby allowing for enhanced safety when protecting the vehicle occupant from an impact generated during a collision of the vehicle with another object, while also maintaining the level of safety when the vehicle occupant is driving.

In order to solve the aforementioned problems, in accordance with an aspect of the present invention, a steering device has an airbag module that is disposed inside a steering wheel for steering a vehicle and that protects a vehicle occupant during a collision of the vehicle with another object by deploying an airbag body toward the vehicle occupant. The steering device includes a detecting unit that detects the collision of the vehicle with another object in advance; and an adjusting unit that positionally adjusts the steering wheel to a neutral position when the collision of the vehicle with another object is detected by the detecting unit, the neutral position of the steering wheel being a position of the steering wheel when the vehicle is traveling straight.

In addition to the aforementioned solution, the adjusting unit preferably includes an engageable-disengageable support member that supports a steering shaft and a steering column in an engageable-disengageable manner. In this case, the steering shaft is preferably adjusted so that the steering wheel is positioned at the neutral position when the engageable-disengageable support member is in a disengaged state.

In addition to the aforementioned solution, the adjusting unit preferably includes a reciprocally rotatable member that is reciprocally rotatable by receiving a rotational force from the steering shaft, and a bridge parts bridged between the reciprocally rotatable member and the steering shaft so as to make the reciprocally rotatable member and the steering shaft rotatable by utilizing rotational forces thereof. In this case, the reciprocally rotatable member is preferably made such that a reciprocal rotation range thereof gradually reaches a termination point when the engageable-disengageable support member is in the disengaged state.

In addition to the aforementioned solution, the airbag module and the steering wheel preferably include engagement grooves that engage with each other. In this case, the airbag module is preferably moved to a specific position on the engagement grooves by utilizing thrust generated when an inflator of the airbag module is actuated.

In addition to the aforementioned solution, the inflator preferably has a plurality of supply holes for supplying gas to the airbag body, the plurality of supply holes being oriented in the same direction.

The steering device according to the present invention sufficiently protects not only the vehicle occupant's head but other body parts without reducing the feeling of security for the vehicle occupant, thereby allowing for enhanced safety when protecting the vehicle occupant from an impact generated during a collision of the vehicle with another object, while also maintaining the level of safety when the vehicle occupant is driving.

DESCRIPTION OF THE PREFERRED EMBODIMENTS

A steering device 100 according to an embodiment of the present invention will be described below with reference to FIGS. 1 to 8. First, the main configuration of the steering device 100 according to the embodiment of the present invention will be described with reference to FIGS. 1 and 2.

Figure 1:
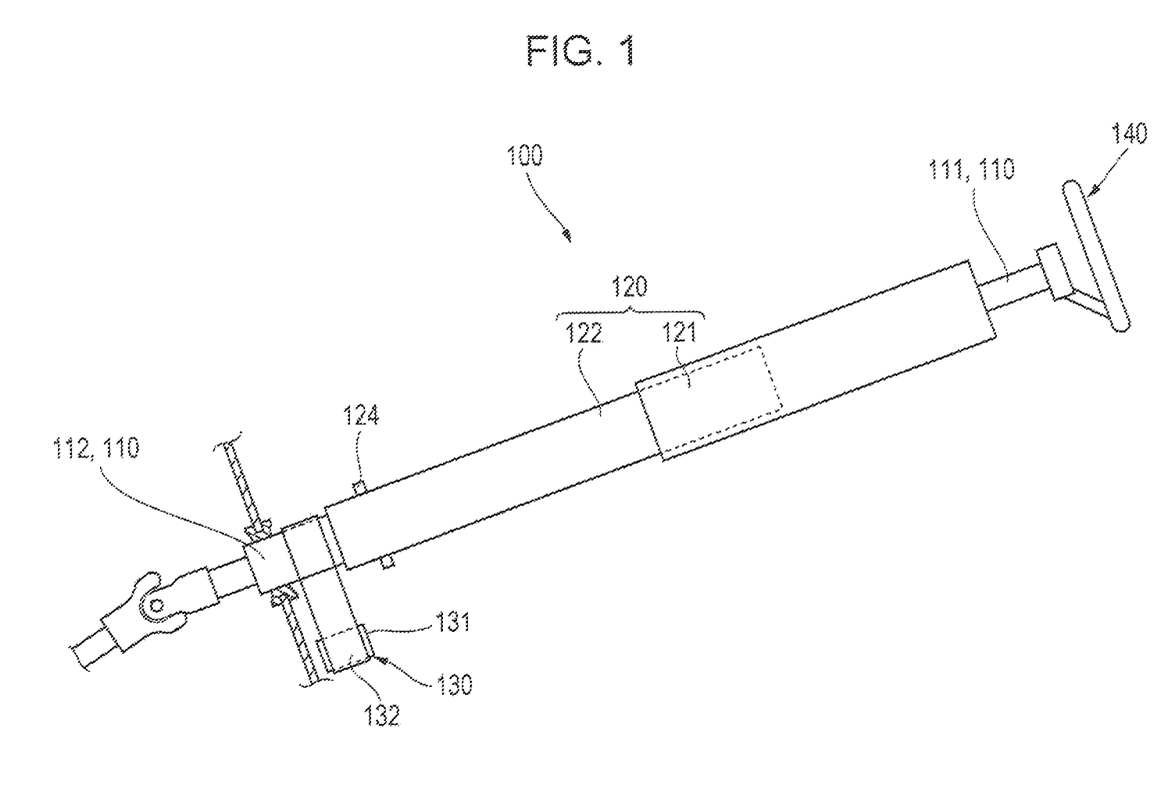
FIG. 1 schematically illustrates a steering device according to an embodiment of the present invention, and is a perspective view of the steering device, as viewed in the vehicle-width direction.
Figure 2:
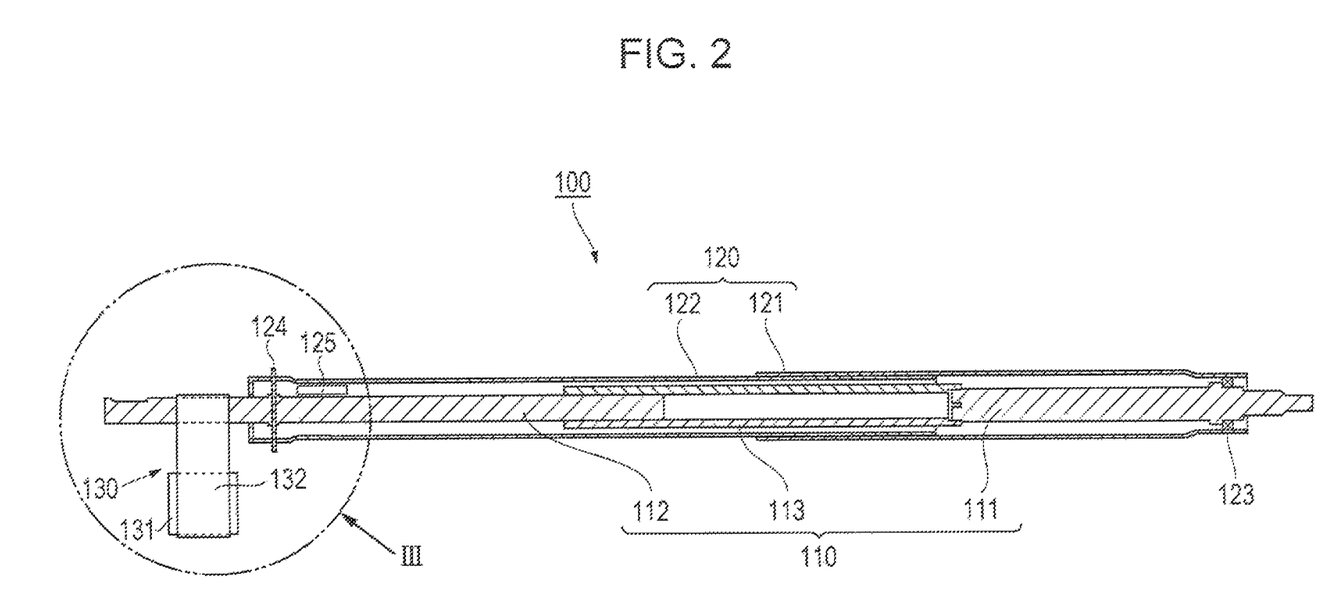
FIG. 2 schematically illustrates the steering device according to the embodiment of the present invention, and is a cross-sectional view of the steering device, as viewed in the vehicle-width direction.
Figure 3:
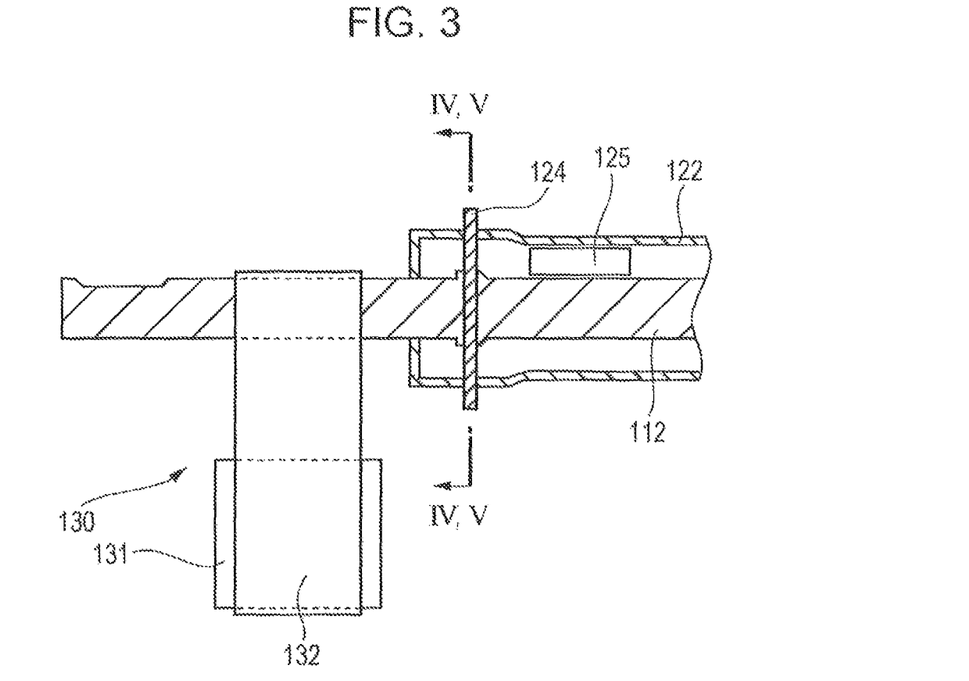
FIG. 3 is an enlarged cross-sectional view of area III in FIG. 2.
Figure 4:
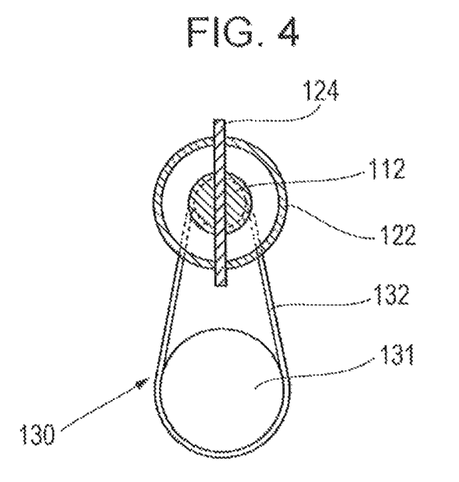
FIG. 4 is a schematic cross-sectional view showing a first state, taken along line IV-IV in FIG. 3.
Figure 5:
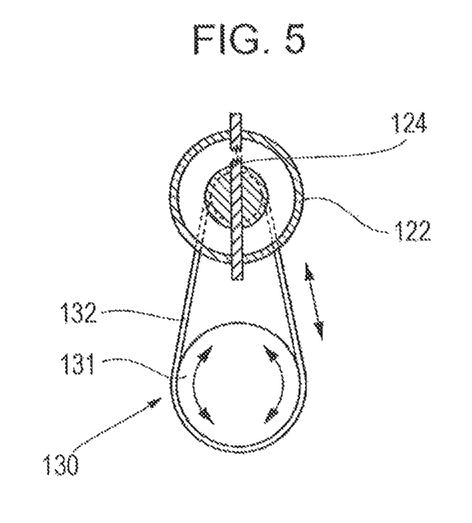
FIG. 5 is a schematic cross-sectional view showing a second state, taken along line V-V in FIG. 3.

FIG. 1 schematically illustrates the steering device 100 according to the embodiment of the present invention, and is a perspective view of the steering device 100, as viewed in the vehicle-width direction. FIG. 2 is a cross-sectional view of the steering device 100, as viewed in the vehicle-width direction.

As shown in FIGS. 1 and 2, the steering device 100 according to this embodiment at least includes a steering shaft 110 that transmits the rotation of a steering wheel 140 to a steering gearbox (not shown), and a tubular steering column 120 that accommodates the steering shaft 110 therein.

In the steering device 100, an airbag module 150 is accommodated inside the steering wheel 140. The airbag module 150 has a function of protecting a vehicle occupant from an impact generated during a collision of a vehicle with another object by deploying an airbag body 151 toward the vehicle occupant during the collision.

Next, the steering shaft 110, which is one of main components in the steering device 100 according to this embodiment, will be described. As mentioned above, the steering shaft 110 has a function of transmitting the rotation of the steering wheel 140 to the steering gearbox (not shown).

The steering shaft 110 is divided into three sections in the axial direction of the steering shaft 110. Specifically, the steering shaft 110 has a first shaft 111 at the steering wheel 140 side, a second shaft 112 at the gearbox side (not shown), and a third shaft 113 that connects the first shaft 111 and the second shaft 112.

The steering shaft 110 is slidable in the axial direction at the respective connection areas of the first shaft 111, the second shaft 112, and the third shaft 113. Therefore, for example, the steering shaft 110 expands and contracts in a telescopic manner.

Accordingly, when the front face of the vehicle collides with an object, the steering shaft 110 expands or contracts by being pressed rearward in the front-rear direction of the vehicle by the steering gearbox (not shown) and a universal joint, thereby absorbing the impact generated during the collision at the front face of the vehicle.

Next, the steering column 120, which is one of the main components in the steering device 100 according to this embodiment, will be described. As mentioned above, the steering column 120 has a function of accommodating the steering shaft 110 therein.

Specifically, as mentioned above, the steering column 120 has a hollow section that can accommodate the steering shaft 110 therein and also has a cylindrical shape for covering the steering shaft 110.

In this embodiment, the steering column 120 is constituted of two jackets, which are an upper jacket 121 and a lower jacket 122. Although the steering column 120 in this embodiment is constituted of the upper jacket 121 and the lower jacket 122, the configuration of the steering column 120 is not limited to this configuration. Alternatively, for example, the steering column 120 may be constituted of three jackets by dividing the upper jacket 121 into two sections.

The upper jacket 121 is provided mainly for covering the first shaft 111, which is the section at the steering wheel 140 side of the steering shaft 110. An end at the steering wheel 140 side of the upper jacket 121 is provided with a first support member 123 that supports the steering shaft 110.

The first support member 123 is constituted of, for example, a bearing that rotatably supports the steering shaft 110, and a pin that connects and supports the steering shaft 110 and the upper jacket 121.

On the other hand, the lower jacket 122 is provided mainly for covering the second shaft 112, which is the section at the steering gearbox side (not shown) of the steering shaft 110. An end at the steering gearbox side (not shown) of the lower jacket 122 is provided with a second support member 124 that supports the steering shaft 110.

In this embodiment, the second support member 124 is constituted Of a pin that connects the steering shaft 110 and the lower jacket 122. In the lower jacket 122, pressure an applying unit 125 that can apply pressure to the second support member 124 is disposed.

As mentioned above, the pressure applying unit 125 has a function of applying pressure toward the second support member 124, and ejects, for example, air pressure toward the second support member 124.

Accordingly, in the steering device 100 according to this embodiment, the second support member 124 is engageable and disengageable by applying pressure to the second support member 124 from the pressure applying unit 125.

Thus, the steering device 100 is made such that, when the second support member 124 is in a disengaged state, the steering shaft 110 and the steering column 120 are rotatable freely relative to each other without affecting each other.

Therefore, in the steering device 100 according to this embodiment, for example, even when the steering shaft 110 rotates while the second support member 124 is in a disengaged state, the steering column 120 does not rotate in conjunction with the steering shaft 110.

Likewise, in the steering device 100 according to this embodiment, for example, even when the steering column 120 rotates while the second support member 124 is in a disengaged state, the steering shaft 110 does not rotate in conjunction with the steering column 120.

Although the first support member 123 is constituted of a bearing, and the second support member 124 is constituted of a pin in the steering device 100 according to this embodiment, each of the first support member 123 and the second support member 124 may alternatively be constituted of, for example, a pin. In this case, the steering device 100 includes the pressure applying unit 125 in each of the upper jacket 121 and the lower jacket 122.

As a further alternative, in the steering device 100, the first support member 123 may be constituted of a pin, and the second support member 124 may be constituted of a bearing. In this case, the steering device 100 includes the pressure applying unit 125 in the upper jacket 121.

As another alternative, in the steering device 100, the steering shaft 110 may be fitted in the steering column 120 without using the first support member 123 and the second support member 124. In this case, the steering device 100 similarly includes the pressure applying unit 125 in each of the upper jacket 121 and the lower jacket 122.

Of the steering shaft 110 and the steering column 120 that are rotatable freely relative to each other by the pressure applying unit 125 in this manner, the steering shaft 110 is provided with adjusting unit 130 for positionally adjusting the steering wheel 140 to a neutral position. The term "neutral position" refers to the position of the steering wheel 140 when the vehicle is traveling straight.

As described above, the adjusting unit 130 positionally adjusts the steering shaft 110 to the neutral position when the second support member 124 that supports the steering shaft 110 and the steering column 120 in an engageable and disengageable manner is engaged or disengaged.

Specifically, the adjusting unit 130 includes a spring (reciprocally rotatable member) 131 that is reciprocally rotatable by receiving a rotational force from the steering shaft 110, and a belt (bridge parts) 132 bridged and wrapped between the spring 131 and the steering shaft 110 so as to make them rotatable by utilizing the rotational forces thereof.

The spring 131 is made such that the reciprocal rotation range thereof gradually reaches a termination point when the second support member 124 is in a disengaged state. Specifically, the spring 131 is disposed at a position where a load in the rotational direction is not applied thereto when the steering wheel 140 is set at the neutral position.

When the spring 131 rotates by receiving a rotational force from the steering shaft 110, the spring 131 first rotates in a first direction and then rotates in a second direction by utilizing a reaction force. After rotating in the second direction, the spring 131 rotates in the first direction by utilizing a reaction force.

Furthermore, the spring 131 repeats the reciprocal rotation from the first direction to the second direction and from the second direction to the first direction until the reciprocal rotation range thereof gradually reaches the termination point. By terminating the rotation of the spring 131 in this manner, the steering shaft 110 is gradually set at the neutral position by the spring 131.

In this embodiment, the timing for actuating the pressure applying unit 125 of the steering device 100 is controlled by a control unit (e.g., ECU). The control unit performs control on the basis of information detected by a detecting unit (not shown) that detects a collision of the vehicle with another object in advance.

Examples of the control unit and the detecting unit include, for example, a unit that perform control by determining the distance from the vehicle to an obstacle in front of the vehicle on the basis of information obtained by a detecting unit that detects the obstacle and then ascertaining a collision of the vehicle with the obstacle in advance in accordance with the determined distance.

Figure 6:
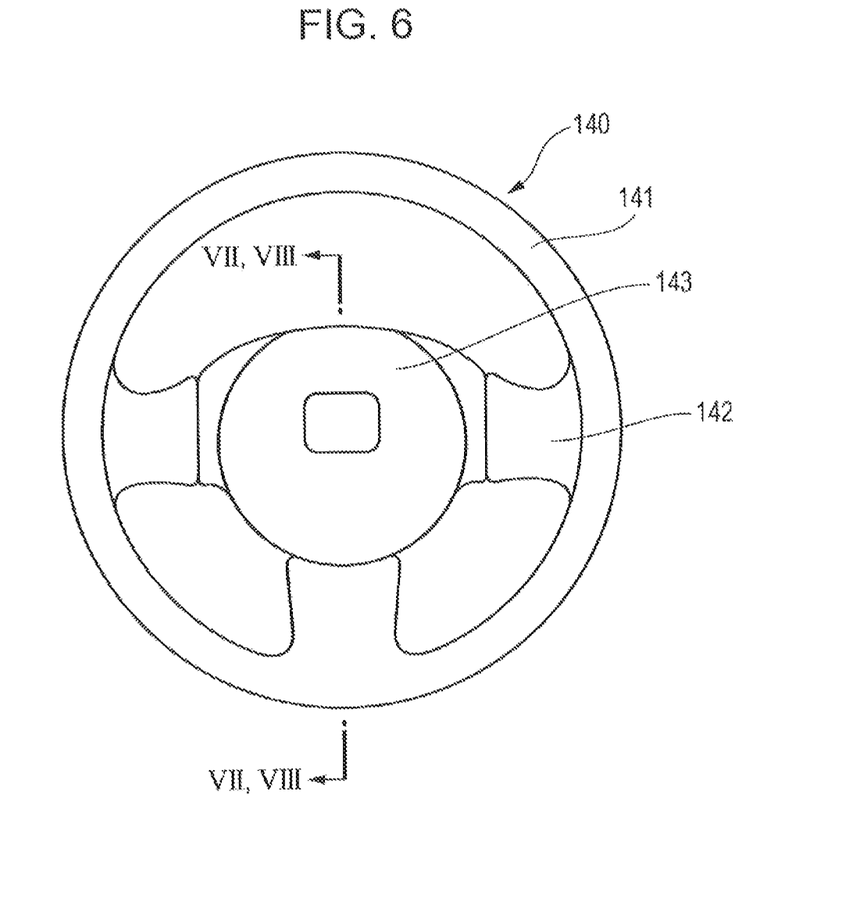
FIG. 6 schematically illustrates a steering wheel according to the embodiment of the present invention, and is a front view of the steering wheel, as viewed from a vehicle-occupant side.

Next, the steering wheel 140, which is one of the main components in the steering device 100 according to this embodiment, will be described with reference to FIG. 6. FIG. 6 schematically illustrates the steering wheel 140 according to the embodiment of the present invention, and is a front view of the steering wheel 140, as viewed from the vehicle-occupant side. The state shown in FIG. 6 corresponds to the neutral position of the steering wheel 140.

As shown in FIG. 6, the steering wheel 140 in this embodiment mainly functions as an operating member to be used by the vehicle occupant for steering the vehicle, as mentioned above. The steering wheel 140 has a ring-shaped rim 141 that defines the outline of the steering wheel 140, and spokes 142 that connect the rim 141 and the steering shaft 110.

Furthermore, the steering wheel 140 includes a center pad 143 that is disposed substantially in the middle of the steering wheel 140 and that covers the spokes 142. In this embodiment, the center pad 143 has a rectangular shape when the center pad 143 is viewed from the vehicle-occupant side.

The center pad 143 is configured to rotate together with the rim 141 when rotated by the vehicle occupant driving the vehicle. With such a configuration, the center pad 143 can allow the vehicle occupant to visually ascertain that the rim 141 is rotated when the vehicle occupant is driving the vehicle. Moreover, the center pad 143 is provided with, for example, a manufacturer's logo so as to have a good design.

The rear surface of the center pad 143 configured to rotate together with the rim 141 operated by the vehicle occupant in this manner is provided with the airbag module 150. As mentioned above, the steering wheel 140 in this embodiment is configured to be set at the neutral position during a collision of the vehicle with another object. Therefore, the shape of the airbag body 151 of the airbag module 150 accommodated in the center pad 143 of the steering wheel 140 can be set in advance.

Figure 7:
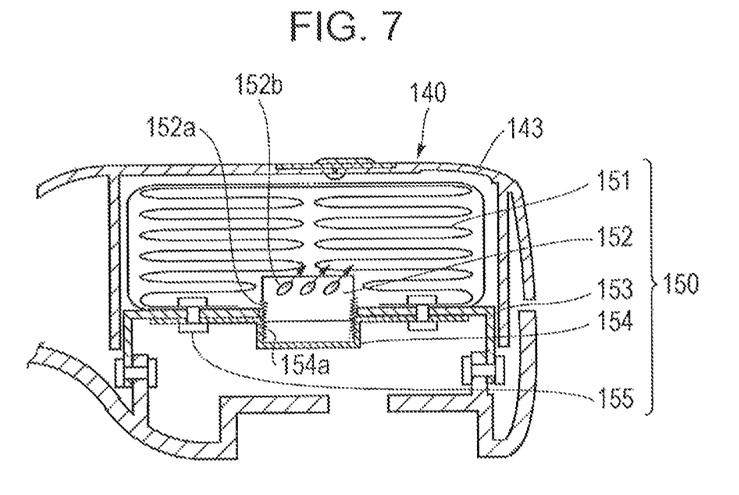
FIG. 7 schematically illustrates an airbag module according to the embodiment of the present invention, and is a cross-sectional view of the airbag module in a first state.
Figure 8:
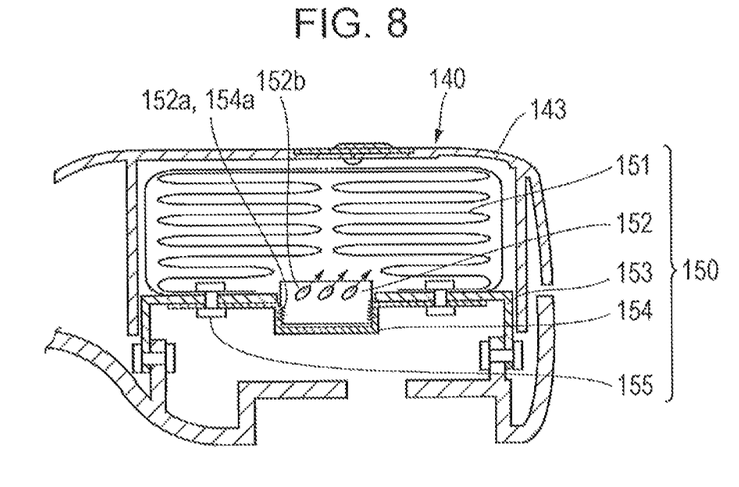
FIG. 8 schematically illustrates an airbag module according to the embodiment of the present invention, and is a cross-sectional view of the airbag module in a second state.

Next, the airbag module 150 provided inside the steering wheel 140 of the steering device 100 according to this embodiment will be described with reference to FIGS. 7 and 8. FIG. 7 schematically illustrates the airbag module 150 according to this embodiment of the present invention, and is a cross-sectional view of the airbag module 150 in a first state. FIG. 8 schematically illustrates the airbag module 150 according to this embodiment of the present invention, and is a cross-sectional view of the airbag module 150 in a second state.

As shown in FIGS. 7 and 8, in this embodiment, the airbag module 150 is disposed inside the steering wheel 140, as mentioned above. The airbag module 150 protects the vehicle occupant from an impact generated during a collision of the vehicle with another object by deploying the airbag body 151 from the steering wheel 140 toward the vehicle occupant.

The airbag module 150 at least includes the airbag body 151 that is normally folded but deployed in the event of an emergency, an inflator 152 that supplies gas to the airbag body 151, and a retainer 153 that accommodates the airbag body 151 and the inflator 152 therein.

As mentioned above, the airbag body 151 constituting the airbag module 150 is to be deployed toward the vehicle occupant by being supplied with gas from the inflator 152 during a collision of the vehicle with another object, and is normally provided in a folded state within a space formed by the center pad 143 and the retainer 153.

As mentioned above, the inflator 152 constituting the airbag module 150 supplies gas to the airbag body 151. The inflator 152 has a cylindrical outer shape.

As mentioned above, the retainer 153 constituting the airbag module 150 forms a space for accommodating the airbag body 151 and the inflator 152 therein together with the center pad 143.

The retainer 153 has a planar portion that forms the space for accommodating the airbag body 151 and the inflator 152 therein, and a leg portion disposed at an outer edge of the planar portion and provided for connecting the retainer 153 to a hub.

Furthermore, the retainer 153 has openings that are circular in plan view and that slidably support roller pins 155, to be described later. The rear surface of the retainer 153 is provided with an accommodation casing 154 for accommodating the inflator 152 therein. The accommodation casing 154 is connected to the retainer 153 via the roller pins 155.

Specifically, the airbag body 151 and the inflator 152 are rotatably supported by the retainer 153 via the accommodation casing 154. In this embodiment, the inflator 152 and the accommodation casing 154 are respectively provided with an inflator engagement groove 152a and an accommodation-casing engagement groove 154a that engage with each other.

The inflator 152 is provided with holes (supply holes) 152b oriented in the same direction for supplying gas to the airbag body 151. Specifically, the airbag module 150 in this embodiment is configured to eject the gas supplied from the inflator 152 in the same direction toward the airbag body 151.

Accordingly, when gas is supplied from the inflator 152 toward the airbag body 151, the airbag body 151 and the inflator 152 in this embodiment rotate by utilizing the thrust of the gas from the inflator 152. Then, when the outer bottom surface of the inflator 152 and the inner bottom surface of the accommodation casing 154 come into contact with each other, the rotation stops.

Specifically, in the airbag module 150 in this embodiment, after the rotation stops due to the outer bottom surface of the inflator 152 and the inner bottom surface of the accommodation casing 154 coming into contact with each other, the airbag body 151 is deployed.

Consequently, since the airbag body 151 is to be deployed at a position where the rotation has stopped, the airbag body 151 is always deployable at the same position. In this manner, the airbag module 150 in this embodiment can always deploy the airbag body 151 from the same position during a collision of the vehicle with another object, whereby the shape of the airbag body 151 can be set in advance.

Accordingly, since the airbag module 150 in this embodiment allows the shape of the airbag body 151 to be set in advance, as mentioned above, for example, a head protection chamber for protecting the vehicle occupant's head and a chest protection chamber for protecting the vehicle occupant's chest can be formed, thereby reducing injury values for the vehicle occupant's head and chest.

Consequently, with the airbag body 151 in this embodiment, since the airbag body 151 is always deployable at the same position when it is to be deployed, as mentioned above, the airbag body 151 can be deployed at an appropriate stable position.

Therefore, the steering device 100 according to this embodiment can sufficiently protect not only the vehicle occupant's head but other body parts, thereby allowing for enhanced safety when protecting the vehicle occupant from an impact generated during a collision of the vehicle with another object.

Accordingly, the steering device 100 according to this embodiment sufficiently protects not only the vehicle occupant's head but other body parts without reducing the feeling of security for the vehicle occupant, thereby allowing for enhanced safety when protecting the vehicle occupant from an impact generated during a collision of the vehicle with another object, while also maintaining the level of safety when the vehicle occupant is driving.

What is claimed is:

1. A steering device having an airbag module that is disposed inside a steering wheel for steering a vehicle and that protects a vehicle occupant during a collision of the vehicle with another object by deploying an airbag body toward the vehicle occupant, the steering device comprising:
   a detecting unit to detect the collision of the vehicle with another object in advance; and
   an adjusting unit to positionally adjust the steering wheel to a neutral position when the collision of the vehicle with another object is detected by the detecting unit, the neutral position of the steering wheel being a position of the steering wheel when the vehicle is traveling straight.

2. The steering device according to claim 1, wherein the adjusting unit includes an engageable-disengageable support member that supports a steering shaft and a steering column in an engageable-disengageable manner, and
   wherein the steering shaft is adjusted so that the steering wheel is positioned at the neutral position when the engageable-disengageable support member is in a disengaged state.

3. The steering device according to claim 2, wherein the adjusting unit includes
   a reciprocally rotatable member reciprocally rotatable by receiving a rotational force from the steering shaft, and
   a bridge parts bridged between the reciprocally rotatable member and the steering shaft so as to make the reciprocally rotatable member and the steering shaft rotatable by utilizing rotational forces thereof, and
   wherein the reciprocally rotatable member is made such that a reciprocal rotation range thereof gradually reaches a termination point when the engageable-disengageable support member is in the disengaged state.

4. The steering device according to claim 1, wherein the airbag module and the steering wheel include engagement grooves that engage with each other, and
   wherein the airbag module is moved to a specific position on the engagement grooves by utilizing thrust generated when an inflator of the airbag module is actuated.

5. The steering device according to claim 2, wherein the airbag module and the steering wheel include engagement grooves that engage with each other, and
   wherein the airbag module is moved to a specific position on the engagement grooves by utilizing thrust generated when an inflator of the airbag module is actuated.

6. The steering device according to claim 3, wherein the airbag module and the steering wheel include engagement grooves that engage with each other, and
   wherein the airbag module is moved to a specific position on the engagement grooves by utilizing thrust generated when an inflator of the airbag module is actuated.

7. The steering device according to claim 4, wherein the inflator has a plurality of supply holes for supplying gas to the airbag body, the plurality of supply holes being oriented in the same direction.

8. The steering device according to claim 5, wherein the inflator has a plurality of supply holes for supplying gas to the airbag body, the plurality of supply holes being oriented in the same direction.

9. The steering device according to claim 6, wherein the inflator has a plurality of supply holes for supplying gas to the airbag body, the plurality of supply holes being oriented in the same direction.

10. A steering device having an airbag module that is disposed inside a steering wheel for steering a vehicle, and that protects a vehicle occupant during a collision of the vehicle with another object by deploying an airbag body toward the vehicle occupant, the steering device comprising:

an adjusting unit configured to adjust the steering wheel from a non-straight-travelling position to the straight-travelling position upon a collision detection by a detection unit.

11. The steering device according to claim 10, further comprising
the detection unit configured to detect a collision of the vehicle, wherein
a collision detection by the detection unit includes detecting a collision in advance.

12. The steering device according to claim 11, wherein
the adjusting unit is configured to adjust the steering wheel to the straight-travelling position by rotating the steering wheel about an axis that extends perpendicular to a plane that is flush with an occupant facing surface of the steering wheel.

13. The steering device according to claim 10, wherein
the airbag module and the steering wheel include engagement grooves that engage with each other, and
the airbag module is moved to a specific position on the engagement grooves by utilizing thrust generated when an inflator of the airbag module is actuated.

14. The steering device according to claim 13, wherein the inflator has a plurality of supply holes for supplying gas to the airbag body, the plurality of supply holes being oriented in the same direction.

15. A steering device having an airbag module that is disposed inside a center pad of a steering wheel for steering a vehicle, and that protects a vehicle occupant during a collision of the vehicle with another object by deploying an airbag body toward the vehicle occupant, the steering device comprising:
an adjusting unit configured to adjust the center pad to a predefined position upon a collision detection by a detection unit by rotating the steering wheel about an axis that extends perpendicular to a plane that is flush with an occupant facing surface of the steering wheel.

16. The steering device according to claim 15, further comprising
the detection unit configured to detect a collision of the vehicle, wherein
a collision detection by the detection unit includes detecting a collision in advance.

17. The steering device according to claim 15, wherein
the adjusting unit is configured to adjust a steering wheel rim of the steering wheel to the predefined position together with the center pad.

18. The steering device according to claim 15, wherein
the airbag includes a head protection chamber and a chest protection chamber, and
the adjusting unit is configured to adjust the center pad to a predefined position such that the head protection chamber and the chest protection chamber, when deployed, are aligned on a common vertical axis with the head protection chamber positioned above the chest protection chamber.

19. The steering device according to claim 15, wherein
the airbag module and the steering wheel include engagement grooves that engage with each other, and
the airbag module is moved to a specific position on the engagement grooves by utilizing thrust generated when an inflator of the airbag module is actuated.

20. The steering device according to claim 19, wherein the inflator has a plurality of supply holes for supplying gas to the airbag body, the plurality of supply holes being oriented in the same direction.

* * * * *